(12) United States Patent
Toida et al.

(10) Patent No.: US 8,113,354 B2
(45) Date of Patent: Feb. 14, 2012

(54) METHOD FOR SORTING MIXED PLASTIC

(75) Inventors: Kozo Toida, Matsuyama (JP);
Kazumasa Mizuno, Matsuyama (JP);
Minoru Nakashima, Matsuyama (JP);
Hitoshi Nagasawa, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 93 days.

(21) Appl. No.: 12/307,200

(22) PCT Filed: Jun. 28, 2007

(86) PCT No.: PCT/JP2007/063408
§ 371 (c)(1),
(2), (4) Date: Dec. 31, 2008

(87) PCT Pub. No.: WO2008/004600
PCT Pub. Date: Jan. 10, 2008

(65) Prior Publication Data
US 2009/0194465 A1    Aug. 6, 2009

(30) Foreign Application Priority Data
Jul. 3, 2006    (JP) .................. 2006-183241

(51) Int. Cl.
*B03B 5/62*    (2006.01)

(52) U.S. Cl. ............. 209/157; 209/158; 209/172.5; 209/173

(58) Field of Classification Search ......... 209/157, 209/158, 162, 172.5, 173
See application file for complete search history.

(56) References Cited

U.S. PATENT DOCUMENTS

| | | | |
|---|---|---|---|
| 5,183,212 A * | 2/1993 | Boo et al. ............. | 241/17 |
| 5,255,859 A * | 10/1993 | Peacock et al. ........ | 241/79.1 |
| 5,653,867 A * | 8/1997 | Jody et al. ............ | 209/164 |
| 6,599,950 B2 * | 7/2003 | Jody et al. ............ | 521/48 |
| 7,014,132 B2 * | 3/2006 | Vandeputte ........... | 241/20 |
| 7,231,927 B2 * | 6/2007 | Suehara ............... | 134/25.1 |
| 7,255,233 B2 * | 8/2007 | Daniels et al. ........ | 209/162 |

FOREIGN PATENT DOCUMENTS

| | | |
|---|---|---|
| EP | 0 555 784 A1 | 8/1993 |
| JP | 48-100760 A | 4/1972 |
| JP | 4-326955 A | 11/1992 |
| JP | 6-063941 A | 3/1994 |
| JP | 09-150417 A | 6/1997 |
| JP | 9-150417 A | 6/1997 |
| JP | 11-333320 A | 12/1999 |
| JP | 2000-288422 A | 10/2000 |
| JP | 2007-125520 A | 5/2007 |

* cited by examiner

*Primary Examiner* — Joseph C Rodriguez
(74) *Attorney, Agent, or Firm* — Sughrue Mion, PLLC

(57) ABSTRACT

A problem of the invention is to provide a method which targets on polyethylene terephthalate-made bottle scraps composed mainly of polyethylene and/or polypropylene, polystyrene and a polyester and which is able to treat continuously a large amount of the polyester component with a high purity and sort and recover it in a high recovery. The problem of the invention can be solved by a separation method of waste plastics, which is characterized by forming previously a crushed plastic into a water slurry, feeding the water slurry in a fixed rate range such that a swirling flow is generated within a cylindrical tank and that water rises in a fixed rate range and recovering a polyester with a high specific gravity as a precipitated component within the cylindrical tank and a plastic with a low specific gravity as an overflow component from the top of the cylindrical tank, respectively.

6 Claims, 2 Drawing Sheets

METHOD FOR SORTING MIXED PLASTIC

TECHNICAL FIELD

The present invention relates to a method for sorting a plastic composed of composite raw materials. In particular, the invention relates to a method for sorting a mixed plastic by utilizing a difference in specific gravity between a plastic with a low specific gravity such as polyethylene and/or polypropylene and a polyester based plastic such as polyethylene terephthalate, both of which are contained in polyethylene terephthalate-made bottle scraps in non-industrial wastes and industrial wastes as aimed to be reused.

BACKGROUND ART

For the purpose of conservation of resources, it is an extremely important problem in the present-day society to recover reusable resources from wastes, apply appropriate treatment and again make them useful, namely to recycle resources. Above all, plastics are made of, as a major raw material, petroleum which is limited resources and when treated as a waste, are liable to cause a lot of environmental problems, and importance for recycling them is large. In waste plastics including polyethylene terephthalate-made bottles, whose sorted collection is relatively advanced, a proportion in which materials used as a container for foodstuffs, cosmetics, detergents, and the like account for is large. In these polyethylene terephthalate-made bottles or the like, in major cases, polyethylene and/or polypropylene which is a plastic with a low specific gravity is used in a cap portion, whereas polyethylene and polystyrene are used for a label or the like. In recycling, such plastics are required to be efficiently sorted with high precision. In advancing the recycle activity, there is desired a technology capable of increasing such sorting precision while increasing the sorting precision and recovery.

As a method for sorting a plastic composite raw material of plastics into a single raw material, a method for the separation by sorting by specific gravity utilizing a gas flow is known (see, for example, Patent Document 1). However, in the gas, a purity of the sorted plastic is limited to about 60 to 70%, and it is difficult to achieve a recycle method to be employed for the same application as in virgin materials. Also, as a sorting method of a plastic having a specific gravity exceeding 1.0 and a plastic having a specific gravity of less than 1.0, there is a method in which plastics are charged in an open water tank and separated into a precipitated plastic and a floated plastic (see, for example, Patent Documents 2 and 3). According to this method, in the case where polystyrene and a polyester, both of which have a specific gravity exceeding 1.0 coexist, it is difficult to sort the both from each other.

Furthermore, there is proposed a method of feeding a water slurry of waste plastics into a center of a cylindrical classifier filled with a liquid and provided with top and lower outlets and recovering a plastic with a low specific gravity from the upper outlet and a plastic with a high specific gravity from the lower outlet by an upward flow and a downward flow, respectively while revolving with a swirling flow (see, for example, Patent Document 4). However, in this method, since the downward flow of the liquid component exists, it is actually difficult to increase chiefly a purity of the plastic with a high specific gravity to 99% or more by the liquid flow. Also, since the rate of the liquid flow falls within a low flow rate range, a problem that very large equipment is required for achieving treatment on a large scale and other problems are involved. Besides, there is also proposed a method for sorting a plastic of a single raw material from a water slurry of waste plastics by a liquid specific gravity separator having a liquid cyclone shape (see, for example, Patent Document 5). However, in major cases, such equipment is generally low in the treatable amount and is unable to respond to the treatment amount on a large scale. For that reason, in the case where the treatment amount increases, it is necessary to set up a number of separators, and there is involved a defect that it cannot be said that this is economically effective.

(Patent Document 1) JP-A-6-63941
(Patent Document 2) JP-A-48-100760
(Patent Document 3) JP-A-4-326955
(Patent Document 4) JP-A-9-15417
(Patent Document 5) JP-A-2000-288422

DISCLOSURE OF THE INVENTION

Problems that the Invention is to Solve

Under the foregoing background of problems of the conventional art, the invention has been made. An object of the invention is to provide a method which targets on polyethylene terephthalate-made bottle scraps composed mainly of polyethylene and/or polypropylene, polystyrene and a polyester and which is able to treat continuously a large amount of the polyester component with a high purity and sort and recover it in a high recovery.

Means for Solving the Problems

In view of the foregoing conventional art, the present inventors made extensive and intensive investigations. As a result, they have accomplished a method for sorting a polyester with a high purity in a high recovery from polyethylene terephthalate-made bottle scraps containing polyethylene and/or polypropylene, polystyrene and a polyester by employing a separation method of waste plastics, which is a method for recovering a plastic with a specified specific gravity from previously crushed waste plastics and which is characterized by using a sorting apparatus including the following steps (a) to (d).

(a) A step in which in a mixing tank having a crushed waste plastic feed port and a water feed port and a discharge port in a bottom part thereof, crushed waste plastics and water are fed into the mixing tank from the crushed waste plastics feed port and the water feed port, respectively; the crushed waste plastic and the water are mixed in the mixing tank to form a water slurry, which is then discharged from the discharge port; and the water slurry of waste plastics is conveyed into a step (b).

(b) A step in which for an apparatus including a cylindrical tank having a water slurry feed port, an overflow port and a discharge port in a bottom part thereof and having a generating line in a vertical direction and conveyance equipment for taking out externally materials filled in the cylindrical tank into the discharge port present in the bottom part of the cylindrical tank via a connection pipe, the water slurry of waste plastics of the step (a) is fed into the inside of the cylindrical tank at a rate of not more than 1.5 m/sec from a water slurry feed port set up in one or more places in a tangential direction of a circle of a columnar curve configuring the inside of the cylindrical tank from the columnar curve so as to generate a swirling flow of water within the cylindrical tank.

(c) A step in which plastics with low and medium specific gravities in the water slurry of waste plastics are discharged together with water from the overflow port set up in the top of the cylindrical tank such that a distance from the water slurry feed port to the upper vertical direction is from 0.4 to 5.0 times an inside diameter of the cylindrical tank by a water flow with a rise rate of from 2 to 20 mm/sec to the vertical direction of the cylindrical tank due to the swirling flow of water in the inside of the cylindrical tank, and at the same time, a plastic with a high specific gravity in the water slurry of waste plastics is precipitated in the bottom part of the cylindrical tank.

(d) A step in which the precipitated plastic with a high specific gravity is discharged from the water slurry by conveyance equipment.

Advantages of the Invention

By employing a sorting method of waste plastics using a separator as described below, a polyester which is a high-purity plastic with a high specific gravity can be sorted in a high recovery from polyethylene terephthalate-made bottle scraps containing polyethylene and/or polypropylene, polystyrene and a polyester, and this method is extremely useful. At the same time, according to the present method, polystyrene which is a plastic with a medium specific gravity and polyethylene and/or polypropylene which is a plastic with a low specific gravity can also be sorted and recovery simultaneously.

BEST MODES FOR CARRYING OUT THE INVENTION

Figure 1:
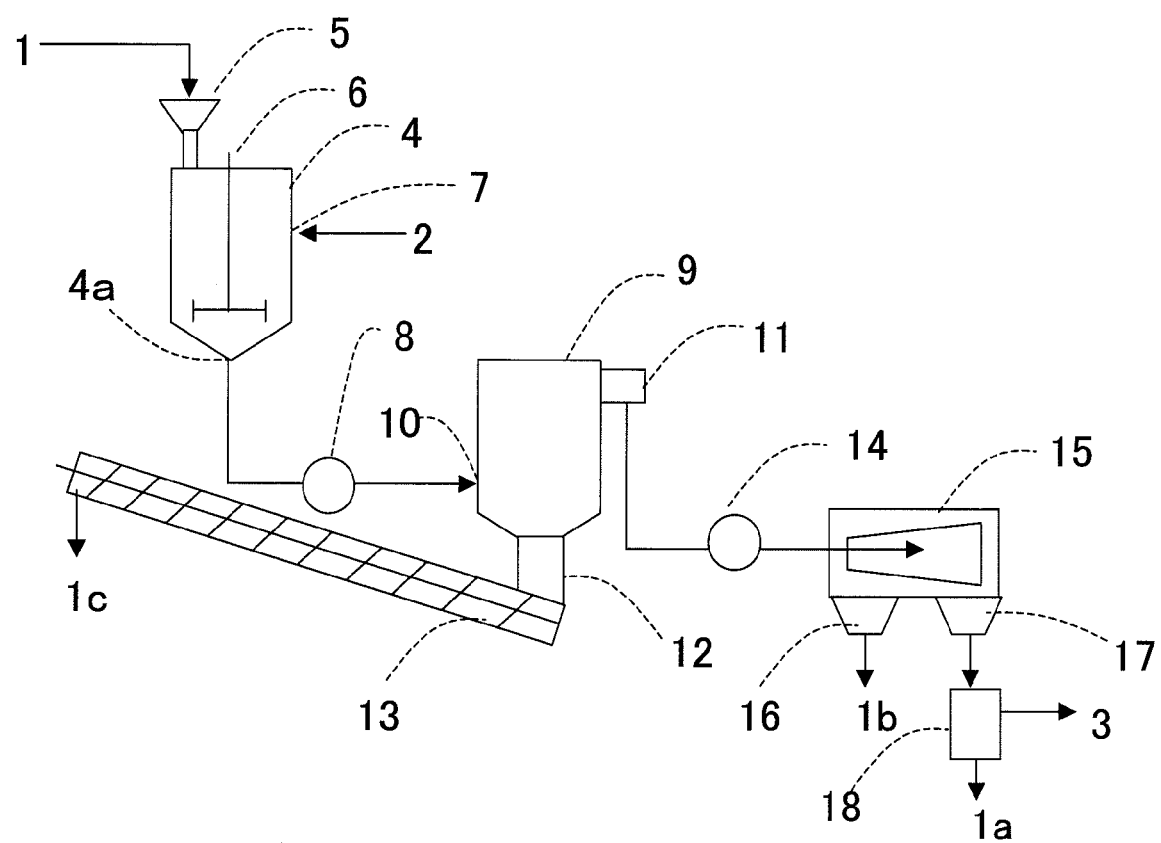
FIG. 1 is an explanatory view of an embodiment of equipment (sorting apparatus) to be used in carrying out the invention.
Figure 2:
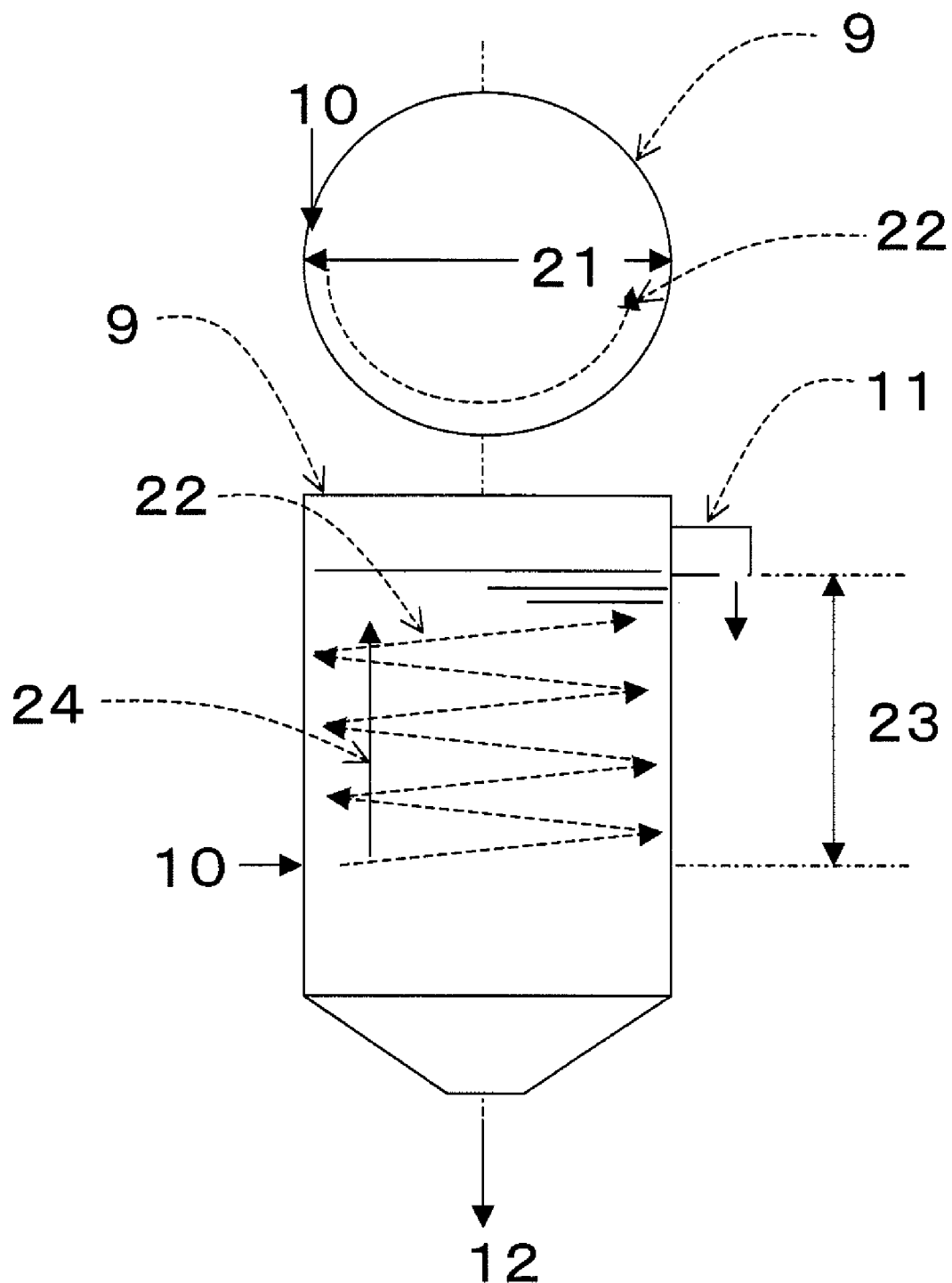
FIG. 2 is an explanatory view of an embodiment of a cylindrical tank to be used in a step (b) of the invention.

With respect to embodiments of the invention, the case where waste plastics are a crushed material of a bottle composed mainly of polyethylene terephthalate (waste polyethylene terephthalate-made bottle) is described in detail with reference to the drawings. Although this is a preferred embodiment of the invention, it should not be construed that the invention is limited to the case where the waste plastics are a waste polyethylene terephthalate-made bottle or the case where equipment exactly the same as in FIG. 1 is used. The terms "composed mainly of polyethylene terephthalate" as referred to herein mean that 70% by weight or more and not more than 100% by weight of the waste plastics are made of waste polyethylene terephthalate.

A waste polyethylene terephthalate-made bottle 1 constituted of polyethylene and/or polypropylene 1$a$, polystyrene 1$b$ and a polyester 1$c$ all of which haven been previously crushed by a crusher (1$a$ to 1$c$ each represents a plastic recovered from an output port) and water 2 are charged into a mixing tank 4 provided with a lower discharge port 4$a$ from a waste polyethylene terephthalate-made bottle feed port 5 and a water feed port 7, respectively. Next, the waste polyethylene terephthalate-made bottle and water are mixed by a stirrer 6 to prepare a uniform water slurry of the waste polyethylene terephthalate-made bottle.

The temperature and pressure during the preparation of the water slurry and during the storage of the water slurry until the discharge from the lower discharge port 4$a$ are not particularly limited, and normal temperature and atmospheric pressure are preferable in view of easiness of the operation. On that occasion, the concentration of the waste polyethylene terephthalate-made bottle in the water slurry can be arbitrarily chosen by adjusting the feed amount of the waste polyethylene terephthalate-made bottle or the feed amount of water. However, when the concentration of the waste polyethylene terephthalate-made bottle is high, it is difficult to mix uniformly the water slurry. Also, since it is difficult to form a swirling flow of water which affects the separation and recovery of the respective plastics in a cylindrical tank in a next step, for the purpose of achieving the object, the concentration of the waste polyethylene terephthalate-made bottle in the water slurry is preferably 0.1% by weight or more and not more than 10% by weight.

The crush size of the waste polyethylene terephthalate-made bottle is not particularly limited. However, when the crush size is small, scuffing of a crushed surface takes place due to an increase of the crushed surface, and the waste polyethylene terephthalate-made bottles are frequently tangled with each other. Accordingly, the crush size is mostly preferably from about 8 mm to 20 mm. The crusher for performing crushing to this size is not particularly limited, and crushers which are usually used for crushing plastics can be favorably used. Furthermore, with respect to a stirring strength, any strength is employable so far as the water slurry of waste polyethylene terephthalate-made bottle can be uniformly mixed, and all of stirring blades which are usually used, for example, a paddle blade and a turbine blade can be used.

The water slurry of waste polyethylene terephthalate-made bottle as mixed is discharged from the mixing tank by a slurry pump 8 and conveyed into a next step. Next, the water slurry is fed from a water slurry port 10 for the waste polyethylene terephthalate-made bottle set up in one or more places in a tangential direction of a circle of a columnar curve configuring the inside of a cylindrical tank 9 from the columnar curve so as to generate a swirling flow of water within the cylindrical tank. In the cylindrical tank 9, a generating line of its cylindrical shape is present in a vertical direction, and in addition to the water slurry feed port 10, an overflow port 11, a lower discharge port and a connection pipe 12 are provided. The cylindrical tank is configured in such a manner that a material filled in the cylindrical tank is discharged into the outside of the cylindrical tank through the discharge port and the connection pipe.

A water slurry feed rate of the waste polyethylene terephthalate-made bottle from this slurry feed port 10 for the waste polyethylene terephthalate-made bottle to the inside of the cylindrical tank is important. When the water slurry feed rate is too fast, a tendency that the polyester component in the waste plastics does not move downwardly in the cylindrical tank due to a centrifugal force but remains in a central part of the inner wall of the cylindrical tank is high. At that time, incorporation of a part of the waste plastics (constituted mainly of polyethylene and polystyrene) in a thin film state such as a component constituting a label as a target for the separation into the polyester component constituting the polyethylene terephthalate-made bottle, or deposition of the label component onto the polyester component surface is easy to occur. As a result, the separation performance of polyethylene and/or polypropylene and polystyrene from the polyester is lowered. Also, in the case where the water slurry feed rate is too fast, in the cylindrical tank, a water stream from an upper part to a lower part of the cylindrical tank disappears, and only a stream from the lower part to the upper part of the cylindrical tank exists. Therefore, a state that a rise rate of the waste polyethylene terephthalate-made bottle in a vertical direction upwardly from the water slurry feed port 10 to the overflow port 11 exceeds a prescribed range is locally generated, the polyester component is incorporated into the overflow port 11 due to the water stream rising within this cylindrical tank, and the recovery is lowered. For that reason, the water slurry feed rate into the inside of the cylindrical tank is required to be not more than 1.5 m/sec and is preferably from 0.1 to 1.5 nm/sec, and more preferably from 0.5 to 1.25 m/sec. When the water slurry feed rate is appropriate, a matter that the waste polyethylene terephthalate-made bottle in the fed water slurry swirls to cause overlapping of small pieces or the like does not occur. Accordingly, the polyester component which is a plastic with a high specific gravity precipitates downwardly in the cylindrical tank.

The plastic with a high specific gravity as referred to herein means a plastic having a specific gravity of 1.2 or more and not more than 2.0; the plastic with a medium specific gravity as referred to herein means aplastic having a specific gravity of 1.0 or more and less than 1.2; and the plastic with a low specific gravity as referred to herein means a plastic having a specific gravity of 0.7 or more and less than 1.0.

A major part of water constituting the water slurry as fed into the inside of the cylindrical tank at the foregoing water slurry feed rate forms a water stream 22 which rises while gradually swirling and is discharged from the overflow port 11 positioned more upwardly than the water slurry feed port 10. Polyethylene and/or polypropylene having a specific gravity of less than 1.0 (corresponding to the plastic with a low specific gravity) is separated from the polyester component and taken out accompanying the water stream swirling within the cylindrical tank from the overflow port 11. The label of the polyethylene terephthalate-made bottle composed mainly of the polystyrene 1b, a specific gravity of which is less than that of the polyester and more than 1.0 (corresponding to the plastic with a medium specific gravity), is taken out from the overflow port 11 together with the water stream 22 rising in a vertical direction of the cylindrical tank while swirling without being incorporated into a side of the polyester by regulating a rise rate 24 in a vertical direction of the cylindrical tank due to the swirling water stream 24 as fed at 2 mm/sec or more.

On the other hand, when the rise rate 24 in a vertical direction of the cylindrical tank due to the swirling water stream 22 within the cylindrical tank exceeds 20 mm/sec, the polyester component is also incorporated into a side of the overflow port due to the swirling water stream 22 similar to the polystyrene. For the purposes of preventing a lowering in the recovery of the polyester as the component with a high specific gravity and keeping a high recovery, it is important to make the rise rate of water fall within the range of from 2 mm/sec to 20 mm/sec. By regulating the rise rate of water at from 2 mm/sec to 10 mm/sec, it is possible to keep a stable high sorting and recovering ability. In order to set up this rise rate at from 2 to 20 mm/sec, the rise rate can be properly set up depending upon the water slurry feed rate from the water slurry feed port for the waste polyethylene terephthalate-made bottle, the number of water slurry feed port, the water slurry concentration, the water slurry feed amount, and the size balance of diameter, height, etc. of the cylindrical tank. Thus, the waste plastics to be carried in on a side of the overflow port by the rising water stream between the water slurry feed port 10 for the waste polyethylene terephthalate-made bottle and the overflow port 11 is precisely separated.

In the case where a distance between the water slurry feed port 10 and the overflow port 11 is short, a separation time cannot be taken, and an incorporation proportion of the polyester component into the side of the overflow port increases. On the other hand, in the case where the distance is long, not only the apparatus size of the cylindrical tank is large, but there is a possibility that a problem that the polystyrene component having a medium specific gravity between polypropylene and/or polyethylene and the polyester remains within the apparatus or other problem is caused. For that reason, by regulating a vertical distance 23 upwardly from the water slurry feed port 10 for the waste polyethylene terephthalate-made bottle to the overflow port 11 at from 0.4 times to 5.0 times an inside diameter 21 of the cylindrical tank, a high-separation performance can be achieved. More preferably, the vertical distance 23 is set up at from 0.4 times to 1.0 time. By setting up the vertical distance 23 at this range, the plastics with low and medium specific gravities and water are selectively discharged from the overflow port positioned more upwardly than the water slurry feed port, and the polyester which is a plastic with a high specific gravity is precipitated.

The polyester component 1c is taken out into the outside of the cylindrical tank from the discharge port in the bottom part of the cylindrical tank and the connection pipe 12 by conveyance equipment 13 such as a screw conveyor. A form that a high-specific gravity component precipitation tank for storing a plastic with a high specific gravity is set up between the cylindrical tank and the conveyance equipment, thereby taking out the polyester component 1c from the precipitation tank may be taken depending upon the amount of treatment. It is possible to dehydrate and dry the taken-out polyester component which is a component with a high specific gravity by means of a known technology and recover it as the polyester component 1c with a high purity. On the other hand, the polyester component is not substantially contained in the water slurry of polyethylene and/or polypropylene and the polystyrene as taken out from the overflow port 11. Accordingly, the component taken out from the overflow port 11 can be easily separated into the polyester component 1b to be taken out from a takeout port 16 for a plastic with a medium specific gravity and water containing the polyethylene and/or polypropylene component 1a to be taken out from a takeout port 17 for a plastic with a low specific gravity by a general separator for performing separation by utilizing a difference in specific gravity such as a centrifuge 15 via a conveyance pump 14.

Furthermore, by performing solid-liquid separation by using a general-purpose solid-liquid separator 18, it is possible to sort this component into the polyethylene and/or polypropylene component 1a and water 3, thereby recovering the polyethylene and/or polypropylene 1a. In the polyester component 1c which is recovered by using the present equipment, a purity of 99.8% or more and a recovery of 99.0% or more can be achieved. In the polyethylene and/or polypropylene 1a which can be simultaneously recovered in the foregoing way, purity and recovery of 99.5% or more can be achieved. By using the present equipment, not only the treatment of waste plastics can be achieved at a treatment rate of several tons or more per hour, but a lowering in the sorting and recovery ability can be prevented by adjusting the water slurry concentration or the like even when the amount of the treatment is lowered, and the method of the invention is an excellent sorting method.

EXAMPLES

The contents of the invention are more specifically described below with reference to the following Examples, but it should not be construed that the invention is limited thereto. A recovery was calculated on a basis of the following expression. A dry weight was measured after keeping at 105° C. a whole day and night and subsequent cooling to normal temperature. The recovery and purity were measured and evaluated in the following manners.

1) Recovery:

Recovery=(Dry weight of sorted plastic in each place)×(Purity of target plastic component)/(Dry weight of target component in starting waste plastics)

2) Purity:

The purity was measured in the following manner.

First of all, a target sample was mixed with water and then allowed to stand until it was separated into a floated component and a precipitated component. The floated component was separated and dried, and then measured for the weight as the polypropylene.polyethylene component. The foregoing precipitated component was taken out, mixed with a liquid having a specific gravity of 1.2 and then allowed to stand in the same manner until it was separated into a floated component and a precipitated component. Thereafter, the floated component and the precipitated component were separated, and each of the components was dried and measured for the weight. The precipitated component was designated as a polyester component.

A purity "1" was calculated according to the following expression while making a sample taken out from a bottom part of the cylindrical tank as a target.

Purity 1=(Weight of polyester component obtained by the foregoing operation)/(Whole weight of target sample taken out from a bottom part of cylindrical tank prior to performing the foregoing purity measurement operation)

A purity "2" was calculated according to the following expression while making a sample taken out from an overflow port of the cylindrical tank as a target.

Purity 2=(Weight of polypropylene.polyethylene component obtained by the foregoing operation)/(Whole weight of target sample taken out from overflow port prior to performing the foregoing purity measurement operation)

Example 1

A separation experiment was carried out by using a waste polyethylene terephthalate-made bottle which had been crushed in a size of 12 mm by the equipment of FIG. 1. After preparing a slurry of the waste polyethylene terephthalate-made bottle and water, a concentration of the water slurry of waste polyethylene terephthalate was adjusted such that a rise rate in a vertical direction of the cylindrical tank was 5 mm/sec; a vertical distance from a water slurry feed port (feed position) of the cylindrical tank to the overflow port was fixed to be 0.6 times an inside diameter of the cylindrical tank; with respect to other treatment condition, a condition as shown in Table 1 was employed; and the waste polyethylene terephthalate-made bottle was treated at 1,000 kg/hr. The results were shown in Example 1 of the following table.

Examples 2 to 8 and Comparative Examples 1 to 5

In Examples 2 to 8 and Comparative Examples 1 to 5, a separation experiment was carried out in the same manner as in Example 1, except for changing the number of water slurry feed port, the water slurry feed rate, the rise rate in a vertical direction of the cylindrical tank and the vertical distance from the water slurry to the overflow port to conditions as shown in Tables 1 to 5. Incidentally, in Example 8, the separation experiment was carried out in the same manner as in Example 1, except for using a waste polyethylene terephthalate-made bottle which had been crushed in a size of mm. Detailed results were summarized in Tables 1 to 5. Evaluation items of the experiment are a purity and a recovery of each of the separated materials.

TABLE 1

|  |  | Example 1 | Example 2 | Example 3 |
|---|---|---|---|---|
| Number of water slurry feed port | Place | 1 | 2 | 1 |
| Feed rate from water slurry feed port | m/sec | 1.25 | 0.75 | 1.5 |
| Rise rate in vertical direction | mm/sec | 5 | 5 | 5 |
| Vertical distance*[1] | Multiple | 0.6 | 0.6 | 0.6 |
| Recovery 1*[2] | % | 99.3 | 99.5 | 99.2 |
| Purity 1 | % | 99.9 | 99.9 | 99.8 |
| Recovery 2*[3] | % | 99.7 | 99.7 | 99.7 |
| Purity 2 | % | 99.6 | 99.6 | 99.8 |

*[1]The vertical distance as referred to herein is a numerical value expressing a vertical distance from the water slurry feed port within the cylindrical tank to the overflow port in terms of a multiple of the inside diameter of the cylindrical tank.
*[2]The recovery 1 as referred to herein means a recovery of the polyester component recovered from the waste PET bottle.
*[3]The recovery 2 as referred to herein means a recovery of the polyethylene and/or polypropylene component recovered from the waste PET bottle.

Those in Tables 2 to 5 are also the same.

TABLE 2

|  |  | Example 4 | Example 5 | Example 6 |
|---|---|---|---|---|
| Number of water slurry feed port | Place | 1 | 1 | 1 |
| Feed rate from water slurry feed port | m/sec | 1.25 | 1.25 | 1.25 |
| Rise rate in vertical direction | mm/sec | 2 | 20 | 5 |
| Vertical distance*[1] | Multiple | 0.6 | 0.6 | 0.4 |
| Recovery 1*[2] | % | 99.4 | 99.0 | 99.1 |
| Purity 1 | % | 99.8 | 99.9 | 99.9 |
| Recovery 2*[3] | % | 99.5 | 99.7 | 99.6 |
| Purity 2 | % | 99.6 | 99.7 | 99.6 |

TABLE 3

|  |  | Example 7 | Example 8 |
|---|---|---|---|
| Number of water slurry feed port | Place | 1 | 1 |
| Feed rate from water slurry feed port | m/sec | 1.25 | 1.25 |
| Rise rate in vertical direction | mm/sec | 5 | 5 |
| Vertical distance*[1] | Multiple | 1.0 | 0.6 |
| Recovery 1*[2] | % | 99.6 | 99.3 |
| Purity 1 | % | 99.9 | 99.9 |
| Recovery 2*[3] | % | 99.5 | 99.7 |
| Purity 2 | % | 99.7 | 99.5 |

TABLE 4

|  |  | Comparative Example 1 | Comparative Example 2 | Comparative Example 3 |
|---|---|---|---|---|
| Number of water slurry feed port | Place | 1 | 2 | 1 |
| Feed rate from water slurry feed port | m/sec | 2 | 2 | 1.25 |
| Rise rate in vertical direction | mm/sec | 5 | 5 | 1 |
| Vertical distance*[1] | Multiple | 0.6 | 0.6 | 0.6 |
| Recovery 1*[2] | % | 98.5 | 97.0 | 99.5 |
| Purity 1 | % | 99.9 | 99.9 | 98.5 |
| Recovery 2*[3] | % | 99.7 | 99.7 | 99.7 |
| Purity 2 | % | 99.6 | 99.6 | 99.8 |

TABLE 5

|  |  | Comparative Example 4 | Comparative Example 5 |
|---|---|---|---|
| Number of water slurry feed port | Place | 1 | 1 |
| Feed rate from water slurry feed port | m/sec | 1.25 | 1.25 |
| Rise rate in vertical direction | mm/sec | 30 | 5 |
| Vertical distance*[1] | Multiple | 0.6 | 0.3 |
| Recovery 1*[2] | % | 97.0 | 98.3 |
| Purity 1 | % | 99.9 | 99.8 |
| Recovery 2*[3] | % | 99.5 | 99.7 |
| Purity 2 | % | 99.6 | 99.7 |

INDUSTRIAL APPLICABILITY

By employing a waste plastic sorting method using a separator as described above, a polyester can be continuously recovered with high efficiency from polyethylene terephthalate-made bottle scraps containing polyethylene and/or polypropylene, polystyrene and a polyester in a large-scale amount of treatment. At the same time, polyethylene and/or polypropylene can also be sorted in a high recovery, and the method of the invention is extremely useful.

The invention claimed is:

1. A separation method of waste plastics which is a method for recovering a plastic with a specified specific gravity from previously crushed waste plastics and which is characterized by using a sorting apparatus including the following steps (a) to (d):
   (a) a step in which in a mixing tank having a crushed waste plastic feed port and a water feed port and a discharge port in a bottom part thereof, crushed waste plastics and water are fed into the mixing tank from the crushed waste plastics feed port and the water feed port, respectively; the crushed waste plastics and the water are mixed in the mixing tank to form a water slurry, which is then discharged from the discharge port; and the water slurry of waste plastics is conveyed into a step (b),
   (b) a step in which for an apparatus including a cylindrical tank having a water slurry feed port, an overflow port and a discharge port in a bottom part thereof and having a generating line in a vertical direction and conveyance equipment for taking out externally materials filled in the cylindrical tank into the discharge port present in the bottom part of the cylindrical tank via a connection pipe, the water slurry of waste plastics of the step (a) is fed into the inside of the cylindrical tank at a rate of not more than 1.5 m/sec from a water slurry feed port set up in one or more places in a tangential direction of a circle of a columnar curve configuring the inside of the cylindrical tank from the columnar curve so as to generate a swirling flow of water within the cylindrical tank,
   (c) a step in which plastics with a specific gravity of 0.7 or more and less than 1.2 in the water slurry of waste plastics are discharged together with water from the overflow port set up in the top of the cylindrical tank such that a distance from the water slurry feed port to the upper vertical direction is from 0.4 to 5.0 times an inside diameter of the cylindrical tank by a water flow with a rise rate of from 2 to 20 mm/sec to the vertical direction of the cylindrical tank due to the swirling flow of water in the inside of the cylindrical tank, and at the same time, a plastic with a specific gravity of 1.2 or more and not more than 2.0 in the water slurry of waste plastics is precipitated in the bottom part of the cylindrical tank, and
   (d) a step in which the precipitated plastic with a specific gravity of 1.2 or more and not more than 2.0 is discharged from the water slurry by conveyance equipment.

2. The separation method of waste plastics according to claim 1, which is characterized in that the previously crushed waste plastics are a crushed material of a bottle composed mainly of polyethylene terephthalate.

3. The separation method of waste plastics according to claim 1, wherein the distance from the water slurry feed port to the upper vertical direction is from 0.4 to 1.0 times an inside diameter of the cylindrical tank.

4. The separation method of waste plastics according to claim 3, wherein the distance from the water slurry feed port to the upper vertical direction is from 0.4 to 0.6 times an inside diameter of the cylindrical tank.

5. The separation method of waste plastics according to claim 1, wherein the rise rate is from 2 to 10 mm/s.

6. The separation method of waste plastics according to claim 2, wherein the crush size is from about 8 mm to 20 mm.

* * * * *